United States Patent
Hiraiwa et al.

(10) Patent No.: US 12,407,005 B2
(45) Date of Patent: Sep. 2, 2025

(54) FUEL CELL SHIP

(71) Applicant: Yanmar Holdings Co., Ltd., Osaka (JP)

(72) Inventors: Takuya Hiraiwa, Osaka (JP); Takehiro Maruyama, Osaka (JP); Yasuyoshi Yamaguchi, Osaka (JP); Manabu Shinagawa, Osaka (JP); Yukihiko Kimura, Kunisaki (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 655 days.

(21) Appl. No.: 17/830,122

(22) Filed: Jun. 1, 2022

(65) Prior Publication Data

US 2022/0393195 A1 Dec. 8, 2022

(30) Foreign Application Priority Data

Jun. 2, 2021 (JP) .................. 2021-092709

(51) Int. Cl.
*H01M 8/04* (2016.01)
*B60L 58/33* (2019.01)
(Continued)

(52) U.S. Cl.
CPC ......... *H01M 8/04074* (2013.01); *B60L 58/33* (2019.02); *H01M 8/0267* (2013.01);
(Continued)

(58) Field of Classification Search
CPC ........... H01M 8/04074; H01M 8/0267; H01M 8/04014; H01M 8/04358; H01M 8/04768
See application file for complete search history.

(56) References Cited

U.S. PATENT DOCUMENTS

2005/0178920 A1* 8/2005 Wilson .................. B64G 1/409
244/171.5

FOREIGN PATENT DOCUMENTS

| CN | 201409006 Y | 2/2010 |
| EP | 2579374 A1 | 4/2013 |

(Continued)

OTHER PUBLICATIONS

European Search Report dated Jun. 6, 2023 issued in EP Application 22175803.0.

*Primary Examiner* — Olatunji A Godo
(74) *Attorney, Agent, or Firm* — NORTON ROSE FULBRIGHT US LLP (57) ABSTRACT

A fuel cell ship includes a cooling system that cools a fuel cell. The cooling system includes a cooling medium tank that accommodates a cooling medium, a cooling medium circulation pipe that circulates the cooling medium between the fuel cell and the cooling medium tank, a cooling tank internal gas detector installed in the cooling medium tank, a cooling tank internal gas discharge pipe connected to the cooling medium tank, and a cooling tank internal gas discharge valve installed in the cooling tank internal gas discharge pipe. The fuel cell ship includes a control unit that controls opening and closing of the cooling tank internal gas discharge valve. The control unit opens the cooling tank internal gas discharge valve when the cooling tank internal gas detector detects that the concentration of the fuel gas in the cooling medium tank is equal to or greater than a specified value determined in advance.

9 Claims, 6 Drawing Sheets

(51) Int. Cl.
*H01M 8/0267* (2016.01)
*H01M 8/04007* (2016.01)
*H01M 8/04014* (2016.01)
*H01M 8/0432* (2016.01)
*H01M 8/04746* (2016.01)

(52) U.S. Cl.
CPC ... *H01M 8/04014* (2013.01); *H01M 8/04358* (2013.01); *H01M 8/04768* (2013.01); *H01M 2250/20* (2013.01)

(56) References Cited

FOREIGN PATENT DOCUMENTS

| | | |
|---|---|---|
| JP | 2004319206 A | 11/2004 |
| JP | 2018-092815 A | 6/2018 |

* cited by examiner

FUEL CELL SHIP

CROSS-REFERENCE TO RELATED APPLICATIONS

This application is claims priority under 35 U.S.C. § 119 to JP Application No. 2021-092709 filed Jun. 2, 2021, the entire contents of which are hereby incorporated by reference.

TECHNICAL FIELD

The present invention relates to a fuel cell ship.

BACKGROUND ART

In the related art, a fuel cell ship in which a fuel gas (for example, hydrogen gas) is supplied from a fuel tank to a fuel cell and a propulsion device is driven by electric power generated by the fuel cell has been proposed (see Patent Document 1, for example).

PRIOR ART DOCUMENT

Patent Document

Patent Document 1: Japanese Unexamined Patent Application Publication No. 2018-92815

SUMMARY OF INVENTION

Technical Problem

Fuel cells generate heat while generating electric power. To maintain an appropriate power generation efficiency in a fuel cell, it is desirable to cool the fuel cell by supplying, for example, a cooling medium (for example, cooling water). However, in such a configuration, when a fuel gas leak occurs in the fuel cell for some reason, the leaking fuel gas may enter a cooling medium tank through pipes for circulating the cooling medium. Considering that the fuel gas is a combustible gas and there is thus a risk of explosion, it is not desirable that the leaking fuel gas is retained in the cooling medium tank.

The present invention has been contrived to solve the above-described problems, and an object thereof is to provide a fuel cell ship capable of preventing leaking fuel gas from entering and staying in a cooling medium tank, when a fuel gas leak occurs in a fuel cell.

Solution to Problem

A fuel cell ship according to one aspect of the present invention includes a fuel cell that generates electric power by an electrochemical reaction of a fuel and a propulsion device that generates a propulsive force on a hull by the electric power supplied from the fuel cell, the fuel cell ship further includes a cooling system that cools the fuel cell, and the cooling system includes a cooling medium tank that accommodates a cooling medium, a cooling medium circulation pipe that circulates the cooling medium between the fuel cell and the cooling medium tank, a cooling tank internal gas detector installed in the cooling medium tank, a cooling tank internal gas discharge pipe connected to the cooling medium tank, and a cooling tank internal gas discharge valve installed in the cooling tank internal gas discharge pipe, the fuel cell ship further including a control unit that controls opening and closing of the cooling tank internal gas discharge valve, and the control unit opening the cooling tank internal gas discharge valve when the cooling tank internal gas detector detects that a concentration of a fuel gas being a gaseous state of the fuel is equal to or greater than a specified value determined in advance in the cooling medium tank.

Advantageous Effects of Invention

According to the above-described configuration, when a fuel gas leak occurs in a fuel cell, it is possible to prevent leaking fuel gas from entering and staying in a cooling medium tank.

DESCRIPTION OF EMBODIMENTS

An embodiment of the present invention will be described below with reference to the drawings. Herein, directions are defined as follows. First, a direction directed from a stern to a bow of a fuel cell ship is "front", and a direction directed from the bow to the stern is "rear". A horizontal direction perpendicular to a front-rear direction is defined as a left-right direction. At this time, when the fuel cell ship is moving forward, the left side is defined as "left" and the right side is defined as "right", when viewed from an operator. An upstream side in a gravity direction perpendicular to the front-rear direction and the left-right direction, is referred to as "up", and a downstream side is referred to as "down".

[1. Schematic Configuration of Fuel Cell Ship]

Figure 1:
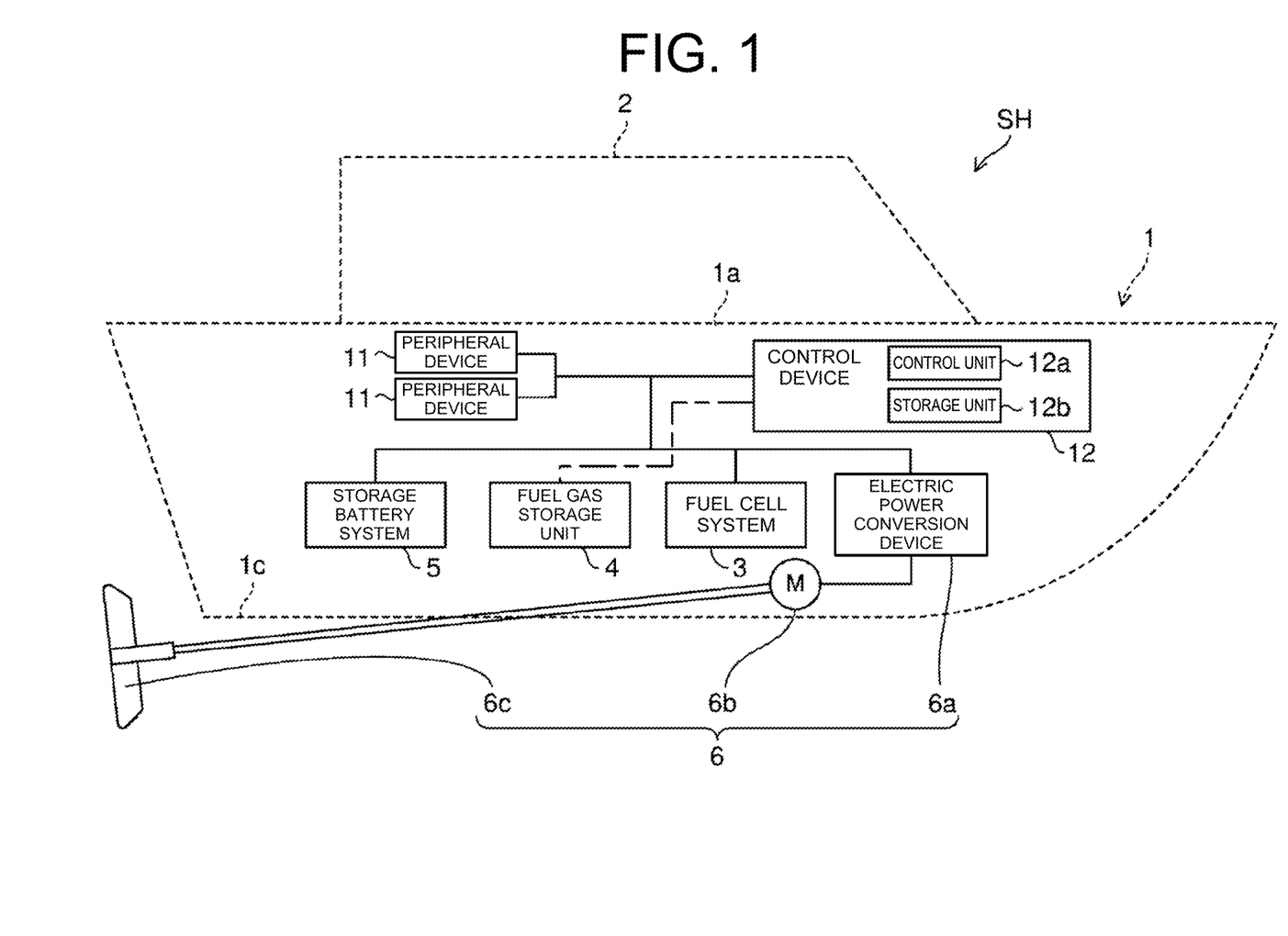
FIG. 1 is an explanatory diagram illustrating a schematic configuration of a fuel cell ship according to an embodiment of the present invention.

First, a fuel cell ship SH according to the present embodiment will be described with reference to FIG. 1. FIG. 1 is an explanatory diagram illustrating a schematic configuration of the fuel cell ship SH. The fuel cell ship SH includes a hull 1 and a cabin 2. The cabin 2 is arranged on an upper surface of the hull 1.

The fuel cell ship SH further includes a fuel cell system 3, a fuel gas storage unit 4, a storage battery system 5, a propulsion device 6, a cooling system 7, a plurality of pieces of peripheral equipment 11, and a control device 12. In FIG. 1, a control signal or a high-voltage power supply line is indicated by a solid line, and a control signal or a low-voltage power supply line is indicated by a dashed line.

The fuel cell system 3 functions as a main power supply. The fuel cell system 3 consumes a fuel gas to generate electric power (specifically, DC electric power). The fuel gas is an example of a fuel, for example, a combustible gas. Typically, the fuel gas is hydrogen gas. The fuel cell system 3 supplies generated electric power to the propulsion device 6 and the peripheral equipment 11. The fuel cell system 3 can also supply electric power to the storage battery system 5 to charge the storage battery system 5. Details of the fuel cell system 3 will be described later.

The fuel gas storage unit 4 stores the fuel gas to be supplied to the fuel cell system 3. Specifically, the fuel gas storage unit 4 includes a fuel tank 41 (see FIG. 2) that accommodates fuel gas as fuel. The fuel gas is supplied from the fuel tank 41 to the fuel cell system 3 via a fuel gas supply pipe 32 described later (see FIG. 2).

The storage battery system 5 includes a storage battery. The storage battery is, for example, a lithium secondary battery, but may also be a nickel-cadmium storage battery, a nickel-hydrogen storage battery, or the like. The storage battery system 5 functions as an auxiliary power source that supplies stored electric power (specifically, DC electric power) to the propulsion device 6 and the peripheral equipment 11. When the storage battery system 5 functions as the auxiliary power source as described above, it is possible to compensate for a shortage of electric power supplied from the fuel cell system 3 to the propulsion device 6 or the like. The storage battery system 5 may supply electric power to the control device 12.

The propulsion device 6 is driven by electric power supplied from a fuel cell 31 (described later) (see FIG. 2) of the fuel cell system 3, and generates a propulsive force on the hull 1. That is, the fuel cell ship SH includes the propulsion device 6 that generates the propulsive force on the hull 1 by the electric power supplied from the fuel cell 31.

It is noted that the propulsion device 6 may be driven only by the electric power supplied from the storage battery included in the storage battery system 5, or may be driven by the electric power supplied from both the fuel cell 31 and the storage battery. That is, the propulsion device 6 may be driven by the electric power supplied from at least one of the fuel cell 31 and the storage battery to generate the propulsive force on the hull 1.

The propulsion device 6 includes an electric power conversion device 6a, a propulsion motor 6b, and a propeller 6c. The electric power conversion device 6a converts the electric power supplied from the fuel cell system 3 into electric power according to the specifications of the propulsion motor 6b. For example, the electric power conversion device 6a converts DC electric power into AC electric power. In this case, the electric power conversion device 6a includes an inverter, for example. The propulsion motor 6b is driven by electric power (for example, AC electric power) supplied from the electric power conversion device 6a. When the propulsion motor 6b is driven, a rotational force of the propulsion motor 6b is transmitted to the propeller 6c. As a result, the propeller 6c rotates, and a propulsive force is generated on the hull 1. A configuration is also possible in which a marine gear is provided between the propulsion motor 6b and the propeller 6c.

Examples of the peripheral equipment 11 include a compressor, a solenoid valve, and a pump. Examples of the peripheral equipment 11 also include electrical equipment such as lighting equipment and air conditioning equipment, but the types of the peripheral equipment 11 are not particularly limited.

The control device 12 controls the fuel cell system 3, the fuel gas storage unit 4, the storage battery system 5, the propulsion device 6, the cooling system 7, and the plurality of pieces of peripheral equipment 11. The control device 12 is configured by one or two or more computers, for example.

The computer is, for example, a programmable logic controller (PLC), but may also be an electronic control unit (ECU). The control device 12 is supplied with electric power from a battery (for example, a lead battery) (not illustrated) or the storage battery of the storage battery system 5.

The control device 12 includes a control unit 12a and a storage unit 12b. The control unit 12a includes a processor such as a central processing unit (CPU). The storage unit 12b includes a storage device and stores data and computer programs. Specifically, the storage unit 12b includes a main storage device such as a semiconductor memory and an auxiliary storage device such as a semiconductor memory, a solid state drive, and/or a hard disk drive. The storage unit 12b may also include removable media. The storage unit 12b corresponds to an example of a non-transitory computer-readable storage medium.

The processor of the control unit 12a executes a computer program stored in the storage device of the storage unit 12b, to control the fuel cell system 3, the fuel gas storage unit 4, the storage battery system 5, the propulsion device 6, the cooling system 7, and the plurality of pieces of peripheral equipment 11.

The cooling system 7 has a function of cooling the fuel cell system 3, and in particular, the fuel cell 31. That is, the fuel cell ship SH according to the present embodiment includes the cooling system 7 for cooling the fuel cell 31. Details of the cooling system 7 will be described later.

[2. Details of Fuel Cell System]

Figure 2:
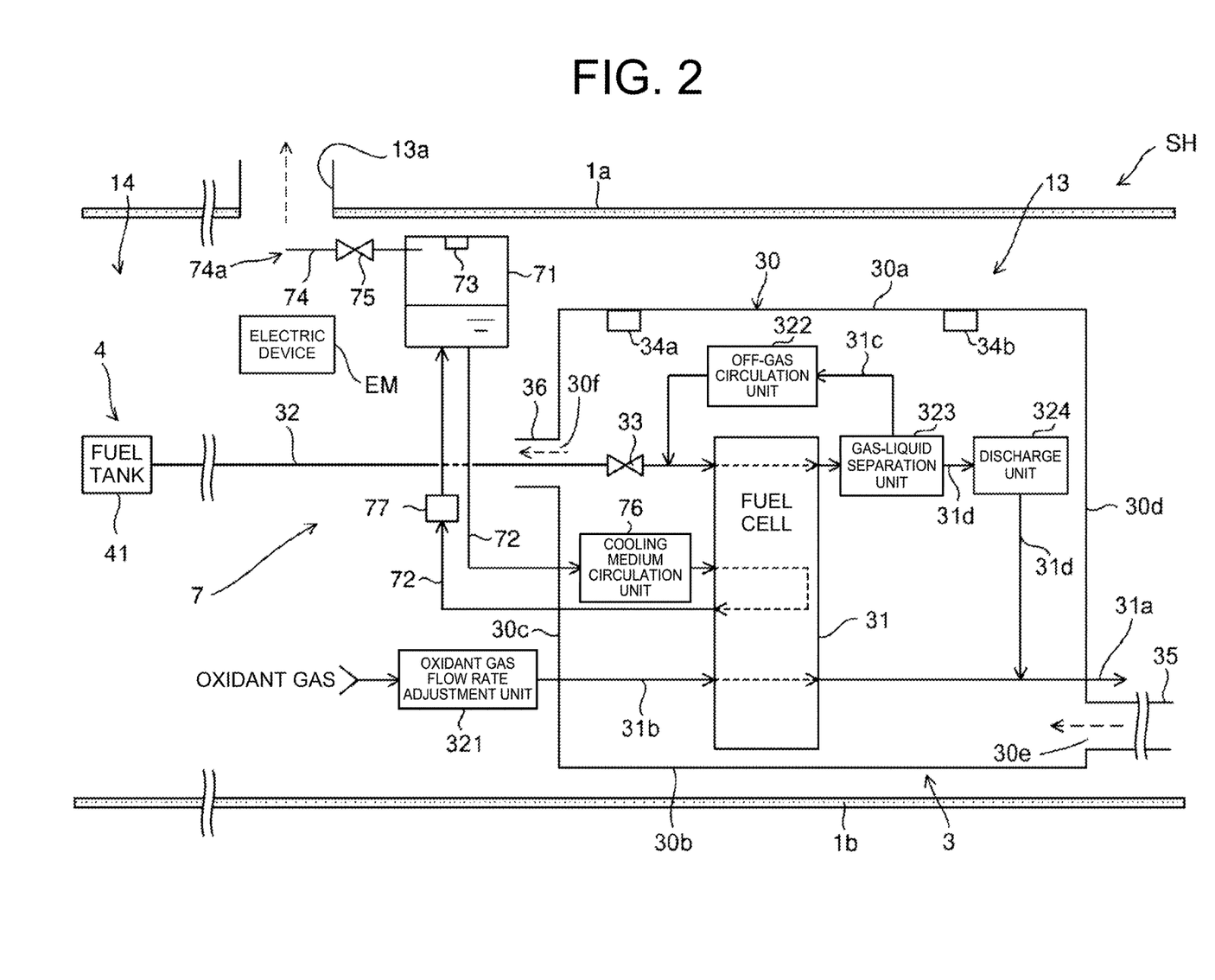
FIG. 2 is an explanatory diagram schematically illustrating an internal structure of the fuel cell ship.

Next, the details of the fuel cell system 3 will be described. FIG. 2 is an explanatory diagram schematically illustrating an internal structure of the fuel cell ship SH.

The fuel cell ship SH includes an engine room 13 and a fuel room 14. The engine room 13 and the fuel room 14 are arranged below a deck 1a of the hull 1. In other words, the engine room 13 and the fuel room 14 are arranged between the deck 1a and a bottom plate 1b of the hull 1. The bottom plate 1b is located between the deck 1a and a ship bottom unit 1c (see FIG. 1).

The engine room 13 is located on the bow side with respect to the fuel room 14. The engine room 13 and the fuel room 14 are separated by a partition wall (not illustrated). The partition wall is formed of fiber reinforced plastics (FRP), for example, but may also be formed of an iron plate. The fuel tank 41 of the fuel gas storage unit 4 described above is located in the fuel room 14. As described above, the fuel cell ship SH includes the fuel tank 41 that accommodates fuel.

The fuel cell system 3 of the fuel cell ship SH is located in the engine room 13. The fuel cell system 3 includes the fuel cell 31, the fuel gas supply pipe 32, and a fuel cell side shutoff valve 33. The fuel cell side shutoff valve 33 is an example of the peripheral equipment 11 (see FIG. 1).

The fuel cell 31 generates electric power (specifically, DC electric power) by an electrochemical reaction between the fuel gas being an example of fuel and an oxidant gas. Typically, the oxidant gas is air and the oxidant is oxygen. That is, the fuel cell ship SH includes the fuel cell 31 that generates electric power by an electrochemical reaction of fuel.

Figure 3:
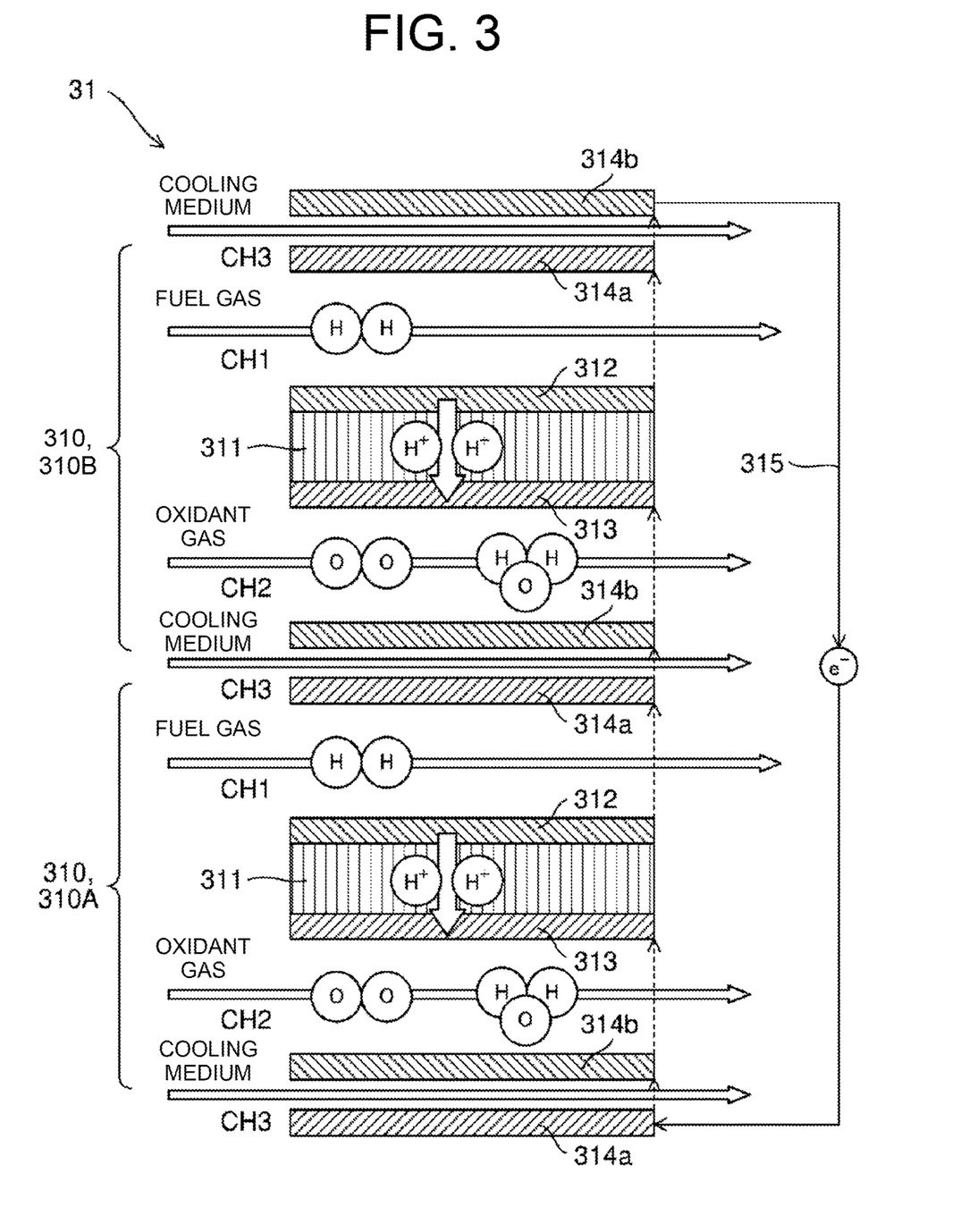
FIG. 3 is an explanatory diagram schematically illustrating a schematic configuration of a fuel cell included in the fuel cell ship.

FIG. 3 is an explanatory diagram schematically illustrating a schematic configuration of the fuel cell 31. The fuel cell 31 is, for example, a polymer electrolyte fuel cell (PEFC), and is formed by a fuel cell stack obtained by stacking a plurality of cells 310. In FIG. 3, for simplification, the fuel cell 31 is illustrated as being composed of two cells 310. Each cell 310 of the fuel cell 31 includes a solid polymer electrolyte membrane 311, an anode electrode 312, a cathode electrode 313, and a pair of separators 314a and 314b.

The solid polymer electrolyte membrane 311 is sandwiched between the anode electrode 312 and the cathode electrode 313. The anode electrode 312 is a negative electrode (fuel electrode). The anode electrode 312 includes an anode catalyst layer and a gas diffusion layer. The cathode electrode 313 is a positive electrode (air electrode). The cathode electrode 313 includes a cathode catalyst layer and a gas diffusion layer. The anode electrode 312, the solid polymer electrolyte membrane 311, and the cathode electrode 313 form a membrane-electrode assembly (MEA). The pair of separators 314a and 314b sandwich the membrane-electrode assembly.

Each of the separators 314a and 314b is made of stainless steel (SUS), for example, and includes ribs having a concave-convex shape and forming a plurality of grooves on both sides. Each groove located on one side (the side facing the anode electrode 312) of the separator 314a forms a flow channel CH1 for the fuel gas. Each groove located on one side (the side facing the cathode electrode 313) of the separator 314b forms a flow channel CH2 for the oxidant gas. Each groove on the other side of the separator 314b of any one of the cells 310 (for example, referred to as a cell 310B) and each groove on the other side of the separator 314a of a cell 310 adjacent to the one cell 310 (for example, referred to as a cell 310A) form a flow channel CH3 for a cooling medium described later. Various types of detectors (pressure sensor, temperature sensor, etc.) are provided in the flow channel CH1 and the flow channel CH3, which will be described later.

In FIG. 3, the flow channel CH3 of the cooling medium is provided between adjacent ones of the cells 310, but it is not necessarily required that the flow channel CH3 is sandwiched between the cells 310. A configuration may be provided in which the flow channel CH3 of the cooling medium is sandwiched for each stack including several cells, as long as each cell 310 can be cooled to an appropriate temperature.

In the above-described configuration of the fuel cell 31, hydrogen contained in the fuel gas flowing through the flow channel CH1 is decomposed into hydrogen ions and electrons by the catalyst on the side of the anode electrode 312 in the cell 310B, for example. Hydrogen ions pass through the solid polymer electrolyte membrane 311 and move to the side of the cathode electrode 313. The concave-convex ribs of the separator 314a of the cell 310B contact the anode electrode 312 by sandwiching the flow channel CH1, and thus, electrons generated at the anode electrode 312 move to the separator 314a. The separator 314a of the cell 310B and the separator 314b sandwiching the flow channel CH3 of the cooling medium with the separator 314a contact each other by the ribs, and thus, the above-mentioned electrons move from the separator 314a to the separator 314b. After moving to the separator 314b, the electrons pass through an external circuit 315 and move to the separator 314a at the opposite end in a stacking direction. Thus, an electric current is generated (electricity is generated).

The separator 314a and the separator 314b of the cell 310A sandwiching the flow channel CH3 of the cooling medium with the separator 314a contact each other by the ribs, and thus, the above-mentioned electrons move from the separator 314a to the separator 314b of the cell 310A. The concave-convex ribs of the separator 314b contact the cathode electrode 313 by sandwiching the flow channel CH2 of the oxidant gas, and thus, after moving to the separator 314b, the electrons move to the cathode electrode 313. On the side of the cathode electrode 313, oxygen contained in the oxidant gas flowing through the flow channel CH2 combines with the above-mentioned electrons and hydrogen ions passing through the solid polymer electrolyte membrane to generate water. The generated water is discharged outside the ship via a discharge pipe 31a (see FIG. 2).

The fuel cell 31 supplies generated electric power to the propulsion device 6 and the peripheral equipment 11 illustrated in FIG. 1. The fuel cell 31 may indirectly supply the generated electric power to the propulsion device 6 and the peripheral equipment 11 via a circuit such as a DC/DC converter or the like.

The fuel gas supply pipe 32 illustrated in FIG. 2 is a fuel supply pipe for supplying, to the anode electrode 312 (see FIG. 3) of the fuel cell 31, the fuel gas accommodated in the fuel tank 41 of the fuel gas storage unit 4. That is, the fuel cell ship SH includes the fuel gas supply pipe 32 as a fuel supply pipe through which fuel is supplied from the fuel tank 41 to the fuel cell 31.

The fuel cell side shutoff valve 33 is a shutoff valve that opens or closes the flow channel of the fuel gas supply pipe 32. The opening and closing of the fuel cell side shutoff valve 33 is controlled by the control unit 12a (see FIG. 1). More specifically, the fuel cell side shutoff valve 33 switches between supplying and stopping the supply of fuel gas from the fuel tank 41 to the fuel cell 31, based on the control by the control unit 12a. Although only one fuel cell side shutoff valve 33 is provided in the fuel gas supply pipe 32 in a fuel cell compartment 30 described later, two or more of the fuel cell side shutoff valves 33 may be provided.

The fuel cell ship SH further includes the fuel cell compartment 30. The fuel cell compartment 30 is a housing body that houses the fuel cell 31, and is arranged in the engine room 13.

The fuel cell compartment 30 has a hollow shape. For example, the fuel cell compartment 30 has a hollow and substantially rectangular parallelepiped shape. In this case, outer walls constituting the fuel cell compartment 30 include, for example, a top wall 30a, a bottom wall 30b, a front wall (not illustrated), a rear wall (not illustrated), a side wall 30c, and a side wall 30d. However, the top surface, bottom surface, front surface, rear surface, and side surfaces of the fuel cell compartment 30 can be freely determined. The shape of the fuel cell compartment 30 is not particularly limited, as long as the fuel cell compartment 30 has a space that can house the fuel cell 31. The fuel cell compartment 30 can also be considered as a container, a chamber, or a box that houses the fuel cell 31. The material of the outer wall of the fuel cell compartment 30 is FRP, for example, but may be an iron plate.

A cell compartment air supply port 30e with an opening is provided in the side wall 30d of the fuel cell compartment 30. The cell compartment air supply port 30e is connected to a cell compartment air supply pipe 35. The cell compartment air supply pipe 35 extends from the cell compartment air supply port 30e to the deck 1a and is exposed from an upper surface of the deck 1a. The cell compartment air supply port 30e may be provided in an outer wall other than the side wall 30d in the fuel cell compartment 30.

On the other hand, a cell compartment exhaust port 30f with an opening is provided in the side wall 30c of the fuel cell compartment 30. The cell compartment exhaust port 30f is connected to a communication unit 36. The communication unit 36 communicates with a duct compartment (not illustrated) forming an exhaust passage. The duct compartment communicates with a vent pipe (not illustrated) that communicates with the outside of the ship. Thus, air entering from the cell compartment air supply pipe 35 via the cell compartment air supply port 30e into the fuel cell compartment 30 is discharged outside the ship via the cell compartment exhaust port 30f, the communication unit 36, the duct compartment, and the vent pipe. As a result, the inside of the fuel cell compartment 30 is ventilated.

The fuel cell compartment 30 has an interior that is a closed space, except for the cell compartment air supply port 30e and the cell compartment exhaust port 30f.

A part of the fuel gas supply pipe 32 described above and the fuel cell side shutoff valve 33 are housed in the fuel cell compartment 30. A cell compartment internal gas detector 34a and a cell compartment internal fire detector 34b are further housed in the fuel cell compartment 30.

The cell compartment internal gas detector 34a is a fuel gas detector arranged inside the fuel cell compartment 30. For example, if the fuel gas is hydrogen gas, the cell compartment internal gas detector 34a is composed of a hydrogen gas detection sensor.

The cell compartment internal gas detector 34a is arranged on an inner surface of the top wall 30a located at an upper part of the fuel cell compartment 30. Hydrogen gas as a fuel gas is lighter than air and rises. Therefore, by arranging the cell compartment internal gas detector 34a on the top wall 30a of the fuel cell compartment 30, leaking fuel gas can be reliably detected by the cell compartment internal gas detector 34a, even if the fuel gas leaks in the fuel cell compartment 30. The installation position of the cell compartment internal gas detector 34a may be configured to be located furthermost downstream of the flow channel through which the fuel gas flows when fuel gas leaks in the fuel cell compartment 30.

If the cell compartment internal gas detector 34a detects fuel gas in the fuel cell compartment 30, a detection signal is transmitted from the cell compartment internal gas detector 34a to the control unit 12a. Accordingly, the control unit 12a can control the fuel cell side shutoff valve 33 provided in the fuel gas supply pipe 32 to stop the supply of fuel gas from the fuel tank 41 to the fuel cell 31.

The cell compartment internal fire detector 34b is a fire detector arranged inside the fuel cell compartment 30. The cell compartment internal fire detector 34b includes, for example, one or more sensors among a smoke sensor that detects smoke, a heat sensor that detects heat, and a flame sensor that detects a flame. The cell compartment internal fire detector 34b may be configured by a thermocouple type fire detector.

The cell compartment internal fire detector 34b is arranged on an inner surface of the top wall 30a located at an upper part of the fuel cell compartment 30. In the unlikely event that a fire occurs inside the fuel cell compartment 30, the cell compartment internal fire detector 34b detects the fire and outputs a detection signal indicating that a fire has occurred to the control unit 12a. In this case, the control unit 12a can control the fuel cell side shutoff valve 33 to stop the supply of fuel gas from the fuel tank 41 to the fuel cell 31. Thus, in the fuel cell compartment 30, the risk of explosion due to ignition of the fuel gas can be reduced as much as possible.

The above-mentioned fuel cell system 3 will be further described. The fuel cell system 3 includes an oxidant gas flow rate adjustment unit 321, an off-gas circulation unit 322, a gas-liquid separation unit 323, and a discharge unit 324. The oxidant gas flow rate adjustment unit 321, the off-gas circulation unit 322, and the discharge unit 324 are examples of the peripheral equipment 11. The control unit 12a controls the oxidant gas flow rate adjustment unit 321, the off-gas circulation unit 322, and the discharge unit 324. The fuel cell system 3 further includes the discharge pipe 31a, an oxidant gas pipe 31b, an off-gas circulation pipe 31c, and a connection pipe 31d. A manifold for circulating the fuel gas, the oxidant gas, and the cooling medium described later is formed inside the fuel cell 31.

The oxidant gas flow rate adjustment unit 321 supplies the oxidant gas to the cathode electrode 313 (see FIG. 3) of the fuel cell 31. Specifically, the oxidant gas flow rate adjustment unit 321 adjusts the flow rate of the oxidant gas supplied to the fuel cell 31. Typically, the oxidant gas flow rate adjustment unit 321 is an air compressor that compresses the oxidant gas.

The oxidant gas pipe 31b guides the oxidant gas supplied from the oxidant gas flow rate adjustment unit 321 to the cathode electrode 313 of the fuel cell 31.

The above-mentioned discharge pipe 31a is connected to a discharge manifold on the side of the cathode electrode 313 provided inside the fuel cell 31. The discharge pipe 31a guides oxidant off-gas and water discharged from the fuel cell 31 to the atmosphere. The oxidant off-gas refers to an exhaust gas from the cathode electrode 313. That is, the oxidant off-gas is a cathode off-gas.

The gas-liquid separation unit 323 separates water contained in the fuel off-gas discharged from the fuel cell 31, and discharges the water to the connection pipe 31d. In addition, the gas-liquid separation unit 323 discharges, to the off-gas circulation pipe 31c, excess fuel gas, which is the fuel off-gas after the water is separated. Typically, the gas-liquid separation unit 323 is a gas-liquid separator. The fuel off-gas refers to an exhaust gas from the anode electrode 312 of the fuel cell 31 (see FIG. 3). That is, the fuel off-gas is an anode off-gas.

The off-gas circulation unit 322 is arranged in the off-gas circulation pipe 31c. The off-gas circulation unit 322 discharges the excess fuel gas discharged from the gas-liquid separation unit 323 to the fuel gas supply pipe 32. Subsequently, the fuel gas supply pipe 32 supplies the excess fuel gas to the fuel cell 31. Typically, the off-gas circulation unit 322 is a pump. For example, the off-gas circulation unit 322 may be an ejector.

The discharge unit 324 is arranged in the connection pipe 31d. The discharge unit 324 discharges the water separated by the gas-liquid separation unit 323. In addition, the discharge unit 324 discharges a part of the fuel off-gas discharged from the fuel cell 31, that is, the remaining gas and water that are not supplied to the off-gas circulation pipe 31c. Typically, the discharge unit 324 is a purge valve.

The water and fuel off-gas discharged from the discharge unit 324 are discharged to the discharge pipe 31a via the connection pipe 31d, and are guided to the atmosphere from the discharge pipe 31a together with the oxidant off-gas (cathode off-gas) discharged from the fuel cell 31.

[3. Details of Cooling System]

Next, details of the cooling system 7 will be described, still with reference to FIG. 2. The cooling system 7 includes a cooling medium tank 71, a cooling medium circulation pipe 72, a cooling tank internal gas detector 73, a cooling tank internal gas discharge pipe 74, and a cooling tank internal gas discharge valve 75.

The cooling medium tank 71 is a container that accommodates the cooling medium. The cooling medium is, for example, an antifreeze liquid having low electrical conductivity. The antifreeze liquid is, for example, a liquid obtained by mixing pure water and ethylene glycol in a predetermined ratio.

The cooling medium tank 71 is installed inside the engine room 13 and outside the fuel cell compartment 30. In other words, when the cooling medium tank 71 is installed in the engine room 13 as described above, the engine room 13 forms a cooling medium installation compartment. Therefore, it can be said that the fuel cell ship SH includes the cooling medium installation compartment (the engine room 13) in which the cooling medium tank 71 is installed.

The fuel gas supply pipe 32 described above extends from the fuel room 14 to the engine room 13 and is connected to the fuel cell 31 of the fuel cell compartment 30. That is, the fuel gas supply pipe 32 passes through the cooling medium installation compartment.

The engine room 13, which is the cooling medium installation compartment, includes a ventilation port 13a that communicates with the outside of the ship. The ventilation port 13a is an air supply/exhaust port formed by penetrating the deck 1a forming the upper wall of the engine room 13. In the present embodiment, the ventilation port 13a is provided on each of a starboard side and a port side of the hull 1. When an air compressor (not illustrated) in the engine room 13 is not driven, for example, air from outside the ship is introduced into the engine room 13 from the ventilation port 13a on the starboard side. Subsequently, the air inside the engine room 13 is discharged outside the ship from the ventilation port 13a on the port side. On the other hand, air from outside the ship may be introduced into the engine room 13 from the ventilation port 13a on the port side and discharged outside the ship from the ventilation port 13a on the starboard side. In both of the above-mentioned air flow patterns, the inside of the engine room 13 is ventilated. In addition, intake and exhaust of air may be performed only by the ventilation port 13a on the starboard side, and intake and exhaust of air may be performed only by the ventilation port 13a on the port side. On the other hand, when the air compressor in the engine room 13 is driven, the air compressor sucks air into the engine room 13 through the ventilation ports 13a on the starboard side and the port side.

The cooling medium circulation pipe 72 is a pipe for circulating the cooling medium between the fuel cell 31 and the cooling medium tank 71. A cooling medium circulation unit 76 and a heat exchanger 77 are arranged partway along the cooling medium circulation pipe 72. The cooling medium circulation unit 76 is formed by a pump, for example. When the cooling medium circulation unit 76 is driven, the cooling medium flows through the cooling medium circulation pipe 72, and the cooling medium circulates between the fuel cell 31 and the cooling medium tank 71. When the cooling medium is supplied to the fuel cell 31, the fuel cell 31 is cooled. The cooling medium used for cooling the fuel cell 31 passes through the cooling medium circulation pipe 72, is cooled by heat exchange performed by the heat exchanger 77, and then, is returned to the cooling medium tank 71. The heat exchanger 77 may be installed between the cooling medium tank 71 and the cooling medium circulation unit 76 in the cooling medium circulation pipe 72.

In FIG. 2, the cooling medium circulation unit 76 is arranged in the fuel cell compartment 30. However, the cooling medium circulation unit 76 may be arranged in the engine room 13 and outside the fuel cell compartment 30.

As described above, the cooling system 7 includes the cooling medium tank 71 accommodating the cooling medium, and the cooling medium circulation pipe 72 for circulating the cooling medium between the fuel cell 31 and the cooling medium tank 71.

The cooling tank internal gas detector 73 is a fuel gas detector that is installed on top inside the cooling medium tank 71 to detect the fuel gas existing inside the cooling medium tank 71. For example, if the fuel gas is hydrogen gas, the cooling tank internal gas detector 73 is configured by a hydrogen gas detection sensor.

An example of the fuel gas existing in the cooling medium tank 71 may include a fuel gas leaking from the fuel cell 31 and entering the cooling medium tank 71 via the cooling medium circulation pipe 72. A result of detecting the fuel gas by the cooling tank internal gas detector 73 (for example, information about the concentration of the fuel gas) is transmitted to the control unit 12a. Thus, the control unit 12a determines, based on the detection result of the cooling tank internal gas detector 73, whether there is a fuel gas leak in the fuel cell 31, and if there is a leak, the control unit 12a can, for example, perform control to stop electric power generation by the fuel cell 31.

The cooling tank internal gas discharge pipe 74 is connected to the cooling medium tank 71 and is a pipe for discharging the fuel gas existing inside the cooling medium tank 71 to the outside. The outlet of the cooling tank internal gas discharge pipe 74, that is, the end of the cooling tank internal gas discharge pipe 74 opposite to the connection side with the cooling medium tank 71 forms a gas discharge port 74a for discharging the fuel gas.

The gas discharge port 74a is located above electrical equipment EM in the cooling medium installation compartment (the engine room 13). The above-mentioned ventilation port 13a of the engine room 13 is located above the gas discharge port 74a. The reason for defining such a positional relationship will be described later. The electrical equipment EM is equipment constituting the peripheral equipment 11. Specific examples of the electrical equipment EM may include an air compressor, a junction box that relays the generated electric power of the fuel cell 31 to the electric power conversion device 6a (see FIG. 1), an inverter, a converter, and the like.

The cooling tank internal gas discharge valve 75 is installed in the cooling tank internal gas discharge pipe 74 to open or close the flow channel for the fuel gas flowing through the cooling tank internal gas discharge pipe 74. The opening and closing of the cooling tank internal gas discharge valve 75 is controlled by the control unit 12a.

As described above, the cooling system 7 includes the cooling tank internal gas detector 73 installed in the cooling medium tank 71, the cooling tank internal gas discharge pipe 74 connected to the cooling medium tank 71, and the cooling tank internal gas discharge valve 75 installed in the cooling tank internal gas discharge pipe 74. In addition, the fuel cell ship SH includes the control unit 12a that controls the opening and closing of the cooling tank internal gas discharge valve 75.

Figure 4:
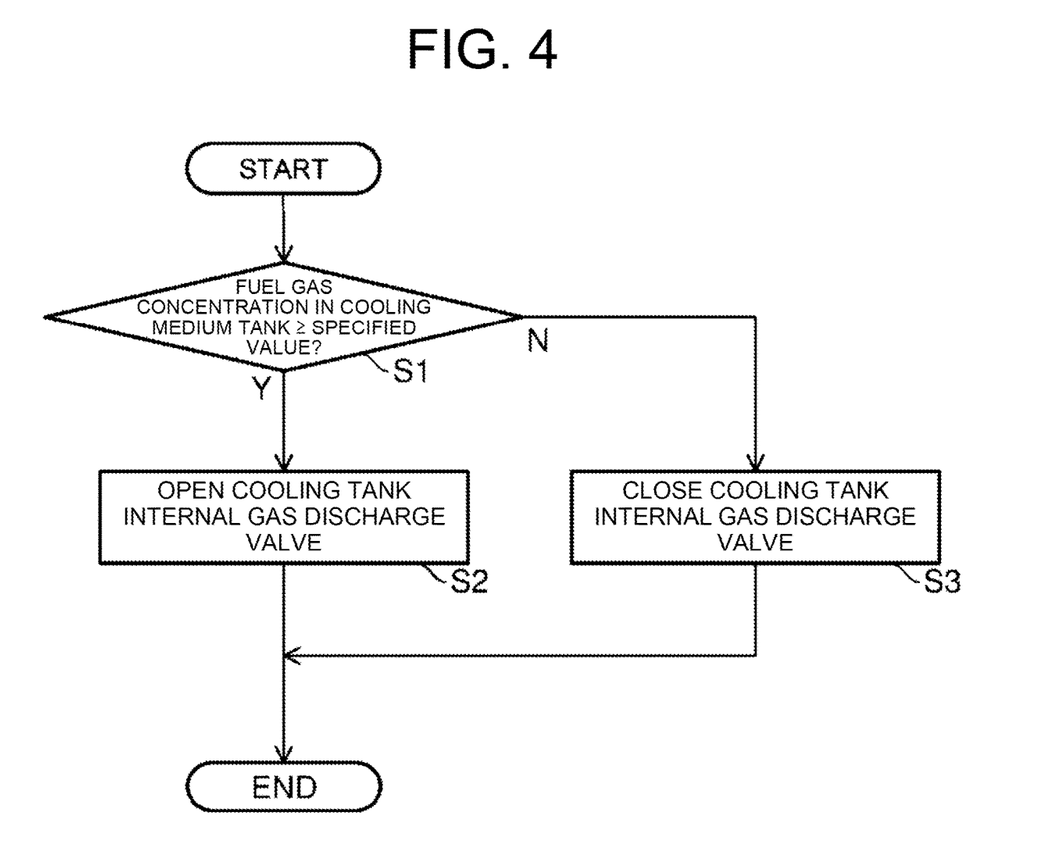
FIG. 4 is a flowchart illustrating a processing flow according to control for opening and closing a cooling tank internal gas discharge valve included in the fuel cell ship.

Next, details of the control for opening and closing the cooling tank internal gas discharge valve 75 by the control unit 12a will be described with reference to FIG. 4. FIG. 4 is a flowchart illustrating a processing flow according to the control for opening and closing the cooling tank internal gas discharge valve 75.

When the cooling tank internal gas detector 73 detects that the concentration of the fuel gas (for example, hydrogen gas) in the cooling medium tank 71 is equal to or greater than a specified value (Yes in S1), the control unit 12a opens the cooling tank internal gas discharge valve 75 (S2). In this case, the fuel gas existing in the cooling medium tank 71 passes through the cooling tank internal gas discharge pipe 74 and is discharged from the gas discharge port 74a. The fuel gas is light, and thus, the fuel gas discharged from the gas discharge port 74*a* in the engine room 13 rises and is discharged outside the ship via the ventilation port 13*a* in the engine room 13.

As the specified value, for example, 40% LEL may be adopted, but the specified value may be appropriately determined based on experiments or experience.

On the other hand, when the cooling tank internal gas detector 73 detects that the concentration of the fuel gas in the cooling medium tank 71 is less than the specified value (No in S1), the control unit 12*a* closes the cooling tank internal gas discharge valve 75 (S3). Thus, the inside of the cooling medium tank 71 is maintained in a sealed state.

As described above, when the cooling tank internal gas detector 73 detects that the concentration of the fuel gas (a gaseous state of the fuel) in the cooling medium tank 71 is equal to or greater than the specified value determined in advance, the control unit 12*a* opens the cooling tank internal gas discharge valve 75 (S1, S2). Thus, even if a fuel gas leak occurs in the fuel cell 31 for some reason and leaking fuel gas enters the cooling medium tank 71 via the cooling medium circulation pipe 72, the fuel gas is discharged from the cooling tank internal gas discharge pipe 74 via the cooling tank internal gas discharge valve 75. Therefore, it is possible to reduce the risk of leaking fuel gas staying in the cooling medium tank 71.

As described above, the gas discharge port 74*a* of the cooling tank internal gas discharge pipe 74 is located above the electrical equipment EM in the engine room 13 in which the cooling medium tank 71 is installed (see FIG. 2). In this case, when the fuel gas leaking from the fuel cell 31 and entering the cooling medium tank 71 is discharged from the gas discharge port 74*a* of the cooling tank internal gas discharge pipe 74, the fuel gas having a low specific gravity (for example, hydrogen gas) rises, and thus, the fuel gas is unlikely to contact the electrical equipment EM located below. Thus, the risk of the discharged fuel gas being ignited by the electrical equipment EM can be reduced.

The ventilation port 13*a* of the engine room 13 is located above the gas discharge port 74*a* (see FIG. 2). Thus, the fuel gas having a low specific gravity discharged from the gas discharge port 74*a* rises from the gas discharge port 74*a* as it is, and then is quickly (efficiently) discharged to the outside of the engine room 13 via the ventilation port 13*a*. Therefore, it is possible to surely reduce the risk of the fuel gas being ignited by the electrical equipment EM in the engine room 13.

The fuel gas supply pipe 32 is a pipe through which the fuel gas passes, and thus, there is a possibility that the fuel gas leaks from the fuel gas supply pipe 32 for some reason. On the other hand, there is a possibility that the fuel gas leaking from the fuel cell 31 enters the cooling medium tank 71 via the cooling medium circulation pipe 72 and accumulates in the cooling medium tank 71. Therefore, the fuel gas accumulated in the cooling medium tank 71 may also leak from the cooling medium tank 71 for some reason.

As described in the present embodiment, the fuel gas supply pipe 32 is located to pass through the engine room 13 in which the cooling medium tank 71 is installed, so that components from which the fuel gas may leak (the fuel gas supply pipe 32 and the cooling medium tank 71) are aggregated in the same space (the engine room 13) in the hull 1. Thus, a range having a risk for fuel gas leakage is smaller than in a case where the cooling medium tank 71 is installed in a place other than the engine room 13, for example. Therefore, it is possible to increase the degree of freedom in design when installing electrical equipment outside the above-mentioned range. For example, even if an air supply fan is installed outside the ventilation port 13*a* of the engine room 13 to actively ventilate the inside of the engine room 13, the range in which the air supply fan can be installed is large, and thus, the degree of freedom when installing the air supply fan can be increased.

Incidentally, in the present embodiment, as illustrated in FIG. 2, the cooling medium tank 71 is connected to an uppermost part of the cooling medium circulation pipe 72. That is, the cooling medium tank 71 is located at an uppermost part of the circulation path of the cooling medium flowing through the cooling medium circulation pipe 72. When the positional relationship (connection relationship) between the cooling medium tank 71 and the cooling medium circulation pipe 72 are defined as described above, the following effects can be obtained.

For example, in a case where the cooling medium tank 71 is connected to a part of the cooling medium circulation pipe 72 other than the uppermost part (for example, a lowermost part) of the cooling medium circulation pipe 72, when the control unit 12*a* opens the cooling tank internal gas discharge valve 75 according to the detection result of the fuel gas by the cooling tank internal gas detector 73, a "cooling medium leak" may occur in which the cooling medium in the cooling medium circulation pipe 72 flows into the cooling medium tank 71 by its own weight and flows out from the gas discharge port 74*a* of the cooling tank internal gas discharge pipe 74.

When the cooling medium tank 71 is connected to the uppermost part of the cooling medium circulation pipe 72 to position the cooling medium tank 71 at the uppermost part of the circulation path of the cooling medium, it possible to prevent the cooling medium in the cooling medium circulation pipe 72 from flowing into the cooling medium tank 71 by its own weight, even if the control unit 12*a* opens the cooling tank internal gas discharge valve 75. This makes it possible to prevent the cooling medium from leaking when the cooling tank internal gas discharge valve 75 is opened.

When the cooling tank internal gas detector 73 detects that the concentration of the fuel gas in the cooling medium tank 71 is less than the specified value determined in advance, the control unit 12*a* closes the cooling tank internal gas discharge valve 75 to seal the cooling medium tank 71 (S3).

When the operating temperature of the fuel cell 31 is high, it may be required to supply pressurized water (a pressurized cooling medium) to the fuel cell 31 to rapidly cool the fuel cell 31. For example, when the operating temperature of the fuel cell 31 exceeds 100° C., the liquid state (having a heat transfer coefficient higher by 10 times or more than that of the gaseous state) cannot be maintained unless the cooling medium is pressurized. If the fuel gas does not leak to the cooling medium tank 71, it possible to easily supply the pressurized water, when the cooling medium tank 71 is sealed. That is, it is possible to pressurize the cooling medium in the cooling medium tank 71 and supply the pressurized cooling medium to the fuel cell 31. The cooling medium tank 71 is sealed, and thus, it is possible to avoid a problem that may occur when the upper part of the cooling medium tank 71 is always open. For example, it is also possible to prevent the cooling medium from flowing out to the outside of the tank due to shaking during navigation of the fuel cell ship SH, and to prevent impurities from mixing with the cooling medium inside the cooling medium tank 71.

In particular, although the optimum operating temperature of the fuel cell 31 being a polymer electrolyte fuel cell is around 80° C., if the fuel cell 31 is continuously driven at a high load, the operating temperature of the fuel cell 31 may rise to 100° C. or higher. Therefore, the above-mentioned control, by which the cooling medium tank 71 is sealed to enable the supply of pressurized water when the fuel gas does not leak to the cooling medium tank 71, is very effective if the operating temperature of the fuel cell 31 is 100° C. or higher. That is, if at least one of the temperature of the cooling medium supplied to the fuel cell 31 and the temperature of the cooling medium discharged from the fuel cell 31 is 100° C. or higher, the above-mentioned control by which the cooling medium tank 71 is sealed to enable the supply of pressurized water is very effective.

Figure 5:
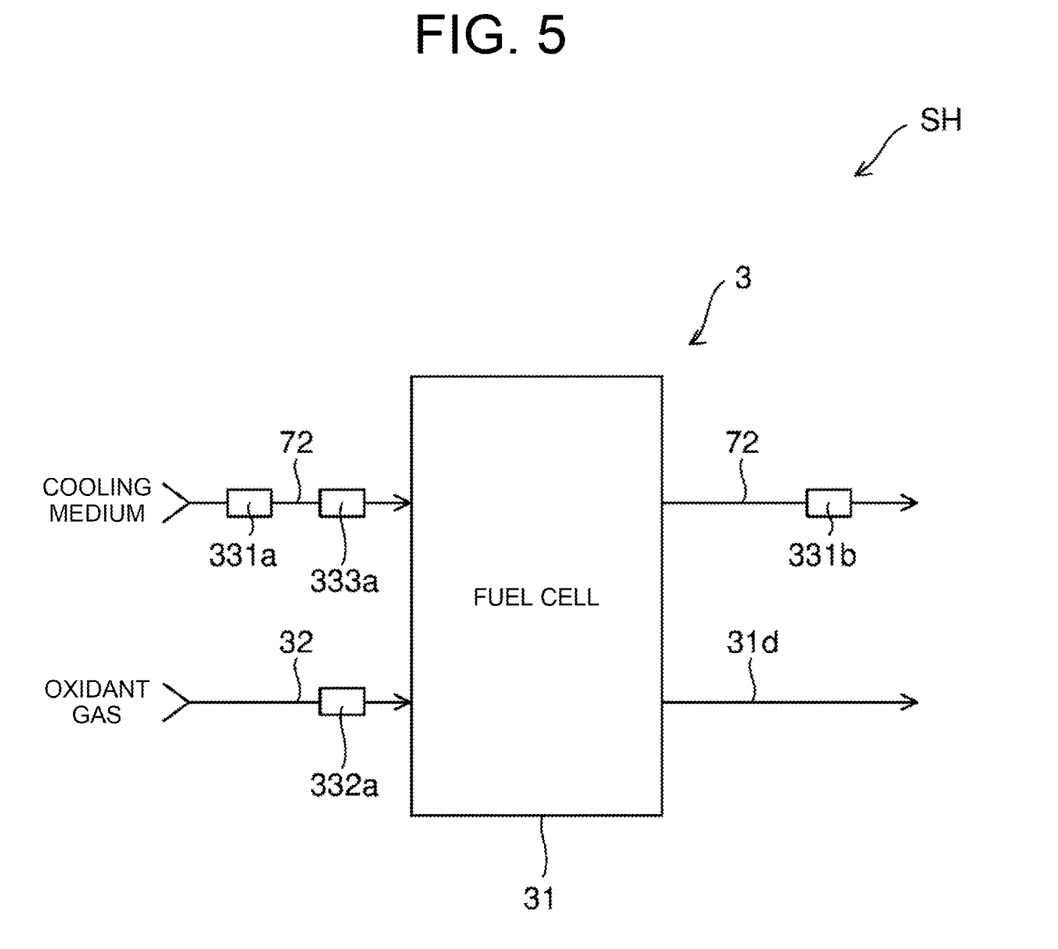
FIG. 5 is an explanatory diagram schematically illustrating a configuration of main parts of the fuel cell ship.
Figure 6:
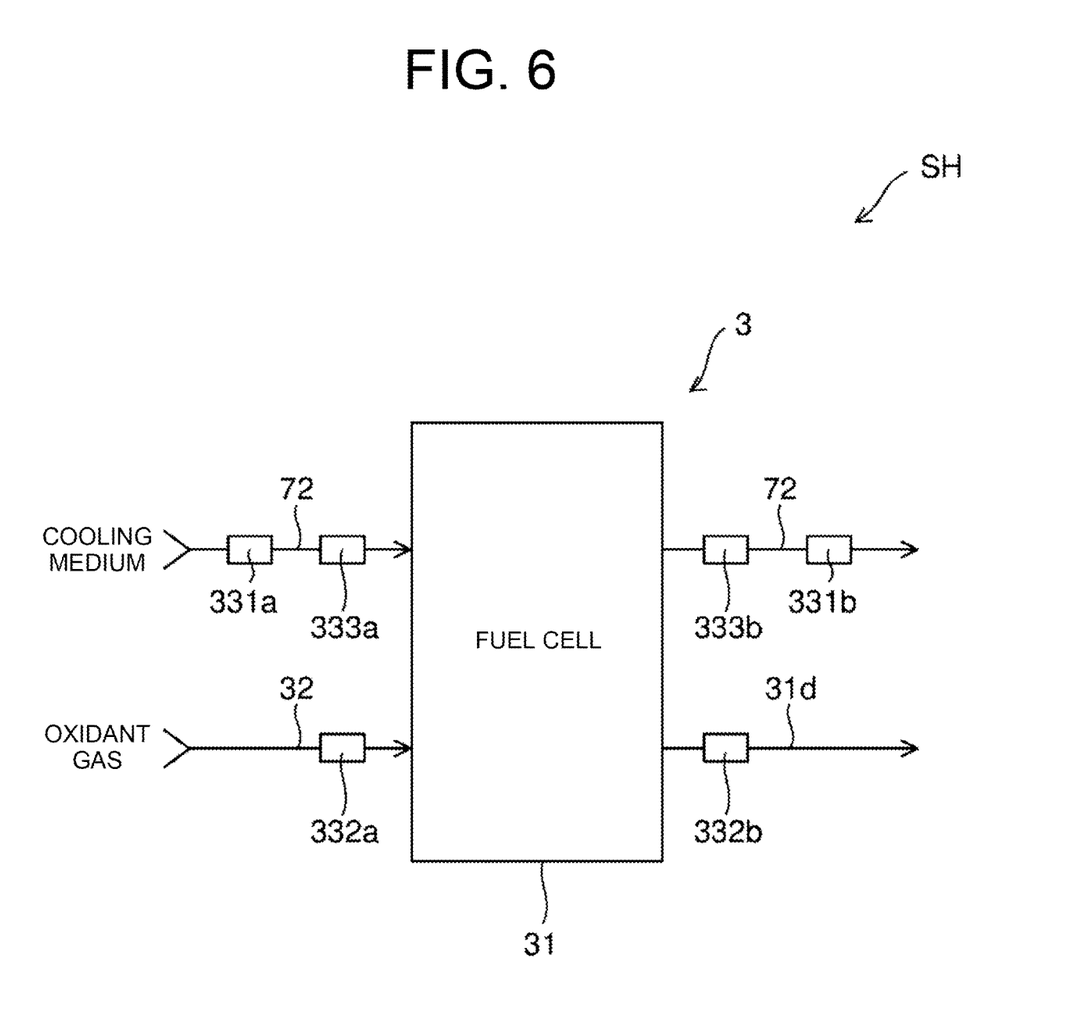
FIG. 6 is an explanatory diagram schematically illustrating another configuration of main parts of the fuel cell ship.

The temperature of the cooling medium supplied to the fuel cell 31 can be monitored by a supply-side cooling medium temperature detection unit 331a illustrated in FIGS. 5 and 6. On the other hand, the temperature of the cooling medium discharged from the fuel cell 31 can be monitored by a discharge-side cooling medium temperature detection unit 331b. The supply-side cooling medium temperature detection unit 331a and the discharge-side cooling medium temperature detection unit 331b are configured by a temperature sensor such as a thermistor.

[4. Control to Prevent Fuel Gas Leakage in Fuel Cell]

FIG. 5 is an explanatory diagram schematically illustrating a configuration of main parts of the fuel cell ship SH. The fuel cell ship SH may include a supply-side fuel gas pressure detection unit 332a and a supply-side cooling medium pressure detection unit 333a. The supply-side fuel gas pressure detection unit 332a is a supply-side fuel pressure detection unit that detects a pressure P1 (MPa) of the fuel (for example, a fuel gas) supplied to the fuel cell 31 (from the fuel tank 41). The supply-side cooling medium pressure detection unit 333a detects a pressure P2 (MPa) of the cooling medium supplied to the fuel cell 31 (from the cooling medium tank 71). The supply-side fuel gas pressure detection unit 332a and the supply-side cooling medium pressure detection unit 333a are each formed by a pressure sensor.

When the pressure P1 of the fuel (for example, the fuel gas) is higher than the pressure P2 of the cooling medium according to the detection results of the supply-side fuel gas pressure detection unit 332a and the supply-side cooling medium pressure detection unit 333a, the control unit 12a desirably stops the power generation by the fuel cell 31.

If P1>P2, fuel may leak to the cooling medium side and mix with the cooling medium on the fuel gas supply side (an anode inlet side) in the fuel cell 31. If P1>P2, when the power generation by the fuel cell 31 is stopped, it possible to suppress the fuel from leaking to the cooling medium side on the fuel supply side in the fuel cell 31.

FIG. 6 is an explanatory diagram schematically illustrating another configuration of main parts of the fuel cell ship SH. In addition to the supply-side fuel gas pressure detection unit 332a and the supply-side cooling medium pressure detection unit 333a illustrated in FIG. 5, the fuel cell ship SH may include a discharge-side fuel gas pressure detection unit 332b and a discharge-side cooling medium pressure detection unit 333b. The discharge-side fuel gas pressure detection unit 332b is a discharge-side fuel pressure detection unit that detects a pressure P3 (MPa) of the fuel (for example, a fuel gas) discharged from the fuel cell 31. The discharge-side cooling medium pressure detection unit 333b detects a pressure P4 (MPa) of the cooling medium discharged from the fuel cell 31. The discharge-side fuel gas pressure detection unit 332b and the discharge-side cooling medium pressure detection unit 333b are each formed by a pressure sensor.

Here, the difference between the pressure P1 of the fuel (for example, the fuel gas) detected by the supply-side fuel gas pressure detection unit 332a and the pressure P2 of the cooling medium detected by the supply-side cooling medium pressure detection unit 333a is defined as a first pressure difference Pd1 (MPa). The difference between the pressure P3 of the fuel (for example, the fuel gas) detected by the discharge-side fuel gas pressure detection unit 332b and the pressure P4 of the cooling medium detected by the discharge-side cooling medium pressure detection unit 333b is defined as a second pressure difference Pd2 (MPa).

The control unit 12a desirably stops the power generation by the fuel cell 31, when at least one of the first pressure difference Pd1 and the second pressure difference Pd2 is equal to or greater than a predetermined value Pth (MPa).

When Pd1≥Pth, that is, when (P1−P2)≥Pth, for example, the supply pressure of the fuel is too much higher than the supply pressure of the cooling medium, so that the fuel may leak to the cooling medium side and mix with the cooling medium on the fuel supply side (the anode inlet side) in the fuel cell 31. On the other hand, when Pd2≥Pth, that is, when (P3−P4)≥Pth, for example, the discharge pressure of the fuel is too much higher than the discharge pressure of the cooling medium, so that the fuel may leak to the cooling medium side and mix with the cooling medium on the fuel discharge side (the anode outlet side) in the fuel cell 31.

If the power generation by the fuel cell 31 is stopped when at least one of the conditions of Pd1≥Pth and Pd2≥Pth is satisfied, it possible to suppress the risk of the fuel leaking to the cooling medium side on at least one of the fuel supply side and the fuel discharge side in the fuel cell 31.

In the present embodiment, a fuel gas being gaseous is used as the fuel supplied from the fuel tank 41 to the fuel cell 31, but the fuel is not limited to a gas and may be a liquid. If a liquid fuel is used, when the liquid fuel leaks from a pipe, the leaked liquid fuel vaporizes and forms a gas (a fuel gas).

Embodiments of the present invention have been described above, however, the scope of the present invention is not limited to these embodiments, and can be extended or modified without departing from the gist of the invention.

INDUSTRIAL APPLICABILITY

The present invention can be utilized in a fuel cell ship, for example.

REFERENCE SIGNS LIST

1 . . . Hull
6 . . . Propulsion device
7 . . . Cooling system
12a . . . Control unit
13 . . . Engine room (cooling medium tank installation compartment)
13a . . . Ventilation port
31 . . . Fuel cell
32 . . . Fuel gas supply pipe (fuel supply pipe)
41 . . . Fuel tank
71 . . . Cooling medium tank
72 . . . Cooling medium circulation pipe
73 . . . Cooling tank internal gas detector
74 . . . Cooling tank internal gas discharge pipe
74a . . . Gas discharge port
75 . . . Cooling tank internal gas discharge valve
332a . . . Supply-side fuel gas pressure detection unit (supply-side fuel pressure detection unit)

333a . . . Supply-side cooling medium pressure detection unit
332b . . . Discharge-side fuel gas pressure detection unit (discharge-side fuel pressure detection unit)
333b . . . Discharge-side cooling medium pressure detection unit
EM . . . Electrical equipment
SH . . . Fuel cell ship

The invention claimed is:

1. A fuel cell ship comprising:
a fuel cell configured to generate electric power by an electrochemical reaction of a fuel;
a propulsion device configured to generate a propulsive force on a hull by the electric power supplied from the fuel cell;
a cooling system configured to cool the fuel cell, the cooling system includes:
a cooling medium tank that accommodates a cooling medium,
a cooling medium circulation pipe configured to circulate the cooling medium between the fuel cell and the cooling medium tank,
a cooling tank internal gas detector installed in the cooling medium tank,
a cooling tank internal gas discharge pipe connected to the cooling medium tank, and
a cooling tank internal gas discharge valve installed in the cooling tank internal gas discharge pipe; and
a control unit configured to control opening and closing of the cooling tank internal gas discharge valve,
wherein the control unit is further configured to open the cooling tank internal gas discharge valve based on the cooling tank internal gas detector detecting that a concentration of a gaseous fuel in the cooling medium tank is equal to or greater than a predetermined value.

2. The fuel cell ship according to claim 1, further comprising:
a cooling medium tank installation compartment where the cooling medium tank is installed,
wherein a gas discharge port of the cooling tank internal gas discharge pipe is located above electrical equipment in the cooling medium tank installation compartment.

3. The fuel cell ship according to claim 2, wherein:
the cooling medium tank installation compartment includes a ventilation port configured to communicate with an outside of the fuel cell ship, and
the ventilation port is located above the gas discharge port.

4. The fuel cell ship according to claim 2, further comprising:
a fuel tank configured to accommodate the fuel; and
a fuel supply pipe configured to supply the fuel from the fuel tank to the fuel cell, and
wherein the fuel supply pipe passes through the cooling medium tank installation compartment.

5. The fuel cell ship according to claim 1, wherein the cooling medium tank is located at an uppermost part of a circulation path of the cooling medium flowing through the cooling medium circulation pipe.

6. The fuel cell ship according to claim 1, further comprising:
a supply-side fuel pressure detection unit configured to detect a pressure of the fuel supplied to the fuel cell; and
a supply-side cooling medium pressure detection unit configured to detect a pressure of the cooling medium supplied to the fuel cell, and
wherein the control unit is configured to stop power generation by the fuel cell based on the pressure of the fuel being greater than the pressure of the cooling medium.

7. The fuel cell ship according to claim 1, further comprising:
a supply-side fuel pressure detection unit configured to detect a pressure of the fuel supplied to the fuel cell;
a supply-side cooling medium pressure detection unit configured to detect a pressure of the cooling medium supplied to the fuel cell;
a discharge-side fuel pressure detection unit configured to detect a pressure of the fuel discharged from the fuel cell; and
a discharge-side cooling medium pressure detection unit configured to detect a pressure of the cooling medium discharged from the fuel cell,
wherein:
a difference between the pressure of the fuel detected by the supply-side fuel pressure detection unit and the pressure of the cooling medium detected by the supply-side cooling medium pressure detection unit is defined as a first pressure difference, and
a difference between the pressure of the fuel detected by the discharge-side fuel pressure detection unit and the pressure of the cooling medium detected by the discharge-side cooling medium pressure detection unit is defined as a second pressure difference,
the control unit is further configured to stop power generation by the fuel cell based on the first pressure difference or the second pressure difference being equal to or greater than a second predetermined value.

8. The fuel cell ship according to claim 1, wherein the control unit is further configured to close the cooling tank internal gas discharge valve to seal the cooling medium tank based on the cooling tank internal gas detector detecting that the concentration of the gaseous fuel in the cooling medium tank is less than the predetermined value.

9. The fuel cell ship according to claim 8, wherein a temperature of the cooling medium supplied to the fuel cell and a temperature of the cooling medium discharged from the fuel cell is greater than or equal to 100° C.

* * * * *